Feb. 16, 1954  S. E. CLEGG  2,669,065
EXTRACTING PLANTS WITH THEIR
ROOTS AND PACKING THE ROOTS
Filed Feb. 3, 1950  2 Sheets-Sheet 2
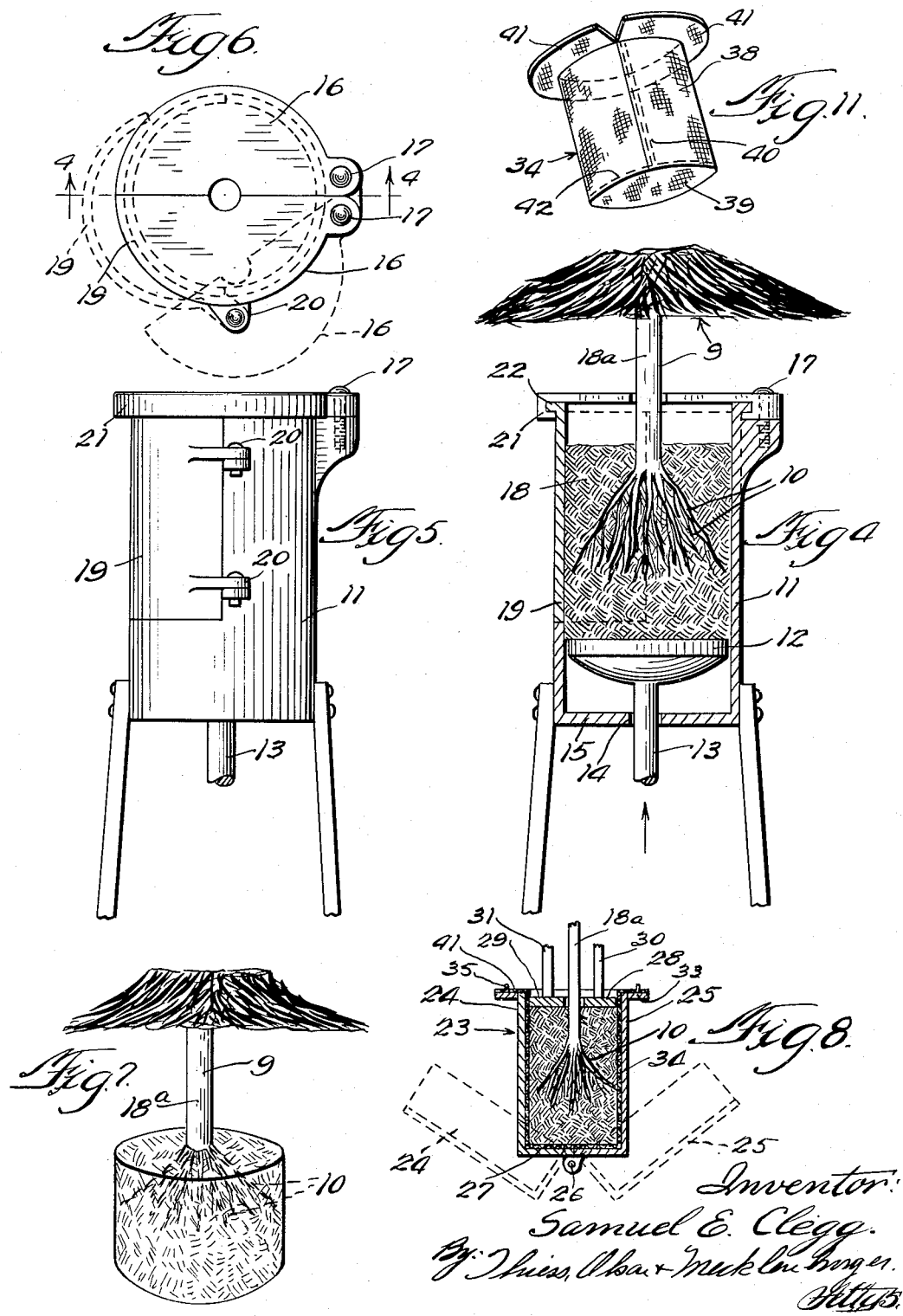

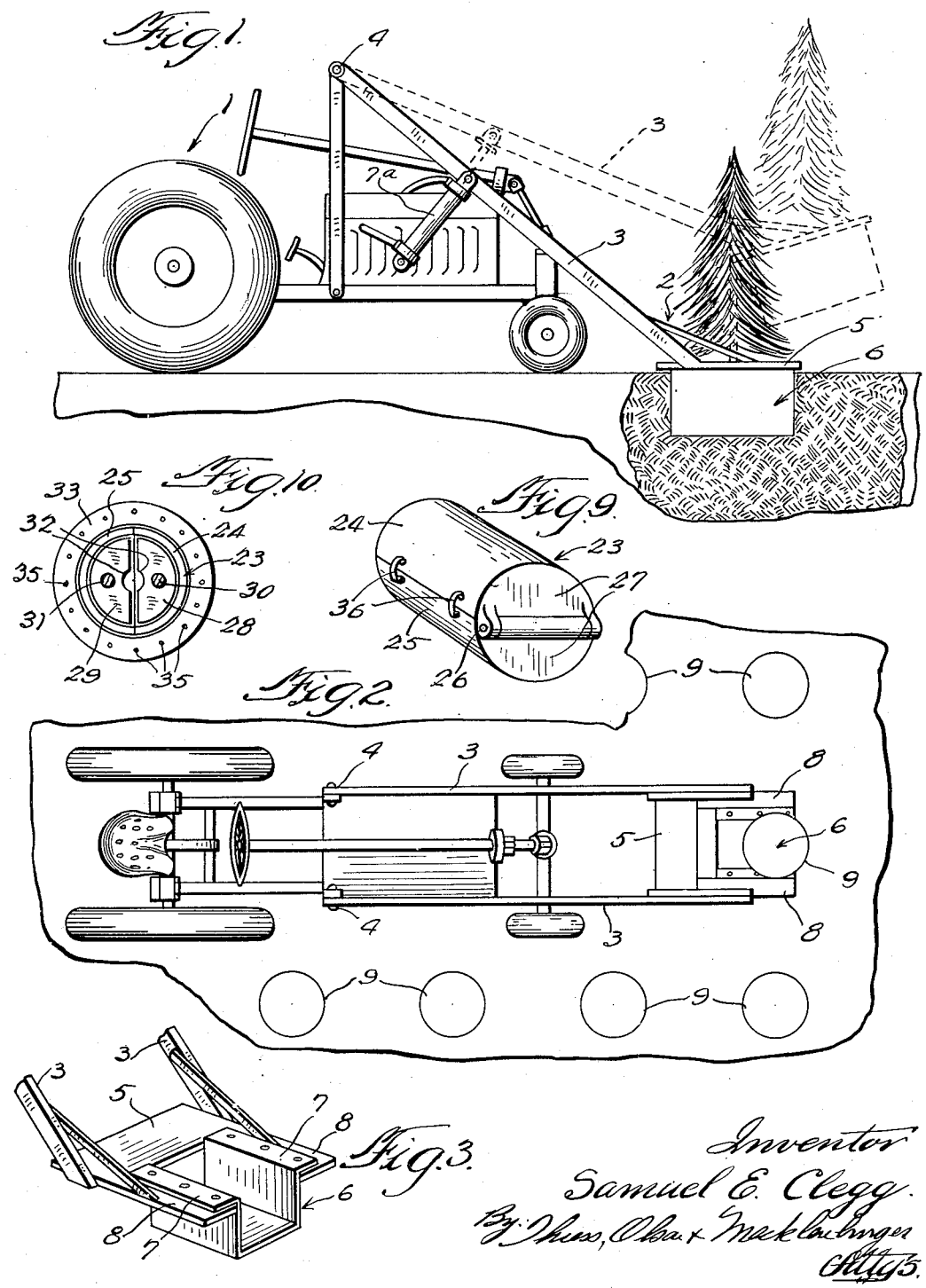

Patented Feb. 16, 1954

2,669,065

UNITED STATES PATENT OFFICE 2,669,065

EXTRACTING PLANTS WITH THEIR ROOTS AND PACKING THE ROOTS

Samuel E. Clegg, Plainfield, Ill.

Application February 3, 1950, Serial No. 142,135

9 Claims. (Cl. 47—37)

My invention relates to extracting trees and plants with their roots, and packing the roots. More in detail it relates to extracting trees, or more broadly plants, including their roots, from their setting in the earth, and packing the roots together with the adhering earth into compact masses.

One of the objects of my invention is to provide an improved apparatus and method for packing the roots and the earth adhering thereto.

A further object is to provide an apparatus and method for packing the roots in which the roots, instead of being brought together closer in a bunch by the packing operation, will be spaced further apart.

A further object is to provide an improved packaged tree or plant.

A further object of my invention is to provide an improved bag for packaging the roots after they have been compressed into a compact mass.

A further object of my invention is to provide an improved apparatus and method for extracting trees or plants from their setting in the earth.

Further objects and advantages of the invention will be apparent from the description and claims.

In the drawings in which my invention is illustrated,

Figure 1 is a side elevational view of an improved apparatus for excavating trees or plants from their setting in the earth;

Fig. 2 is a plan view of Fig. 1, indicating diagrammatically rows of trees which are to be extracted;

Fig. 3 is a perspective view of the excavating scoop or shovel and the mounting therefor;

Fig. 4 is a vertical axial sectional view of apparatus for packaging the roots and adhering earth of a removed tree;

Fig. 5 is a side elevational view of the packaging apparatus;

Fig. 6 is a top plan view of the packaging apparatus;

Fig. 7 is a perspective view of a tree showing the roots and the adhering and surrounding mass of earth compressed into a compact cylindrical mass;

Fig. 8 is a vertical axial section showing another form of apparatus for packaging roots of plants;

Fig. 9 is a perspective view of the apparatus shown in Fig. 8;

Fig. 10 is a top plan view of the apparatus shown in Fig. 8; and

Fig. 11 is a perspective view of a bag for packaging the goods.

For getting the tree out of the ground and retaining as much of the dirt which originally surrounds the roots in its original position with respect to the roots, I may make use of a piece of apparatus which is somewhat on the order of a manure loader, for undercutting the roots, lifting them, together with the dirt surrounding the roots, out of the dirt trough in which they are lying when cut, and removing the trees with the roots and surrounding dirt from the apparatus. Figs. 1, 2, and 3 are illustrative of this part of the method. The construction shown in these figures comprises, roughly, a tractor 1, elevator apparatus 2, comprising a pair of carrying beams 3, shown in two positions in Fig. 1, rockably mounted at 4 on the frame of the tractor to swing from its lower subterranean cutting position, shown in full lines in Fig. 1, to its raised superterranean position, shown in dotted lines. The beam 3 has secured to its front end, plate 5 to which is permanently, or detachably and adjustably, secured a channel-shaped cutting plough 6 (see Figs. 2 and 3), the horizontal wing portions 7 of which are secured to the bifurcations 8 of the plate 5. The beam is raised by a hydraulic lift 7a.

In using this construction, the beams 3 are dropped to allow the channel-shaped cutter 6 to go to its lower cutting position and the machine is advanced to undercut and sidecut the roots of one of the trees 9, as shown in Fig. 2. The cutter beams 3 are then raised to move the cutter above the ground level, and the tractor and elevator beams are manipulated to bring the cutter above and in engagement with a ground level part of the terrain. The tractor is then backed up and the rear edge of the cutter, which is also sharp, digs into the ground. This forces the dirt into the rear end of the cutter and pushes the plant out of the front end.

Referring now to Figs. 4 to 7, inclusive, the construction shown for packing roots 10 of the tree or plant 9 comprises a cylinder 11 into which the roots of the tree are inserted after removal from the ground, and a piston 12 operating in the cylinder 11 for packing the dirt and roots. The piston rod 13 is operated by any power means (not shown) and operates through an opening 14 in the lower end 15 of the cylinder 11. The upper end of the cylinder 11 is closed by two semicircular separable cylinder head members 16 which are pivotally and detachably securable at 17 to the cylinder 11.

In using this, both of the cylinder head members 16 are swung away from the tree trunk, one being thus shown in Fig. 6, the piston 12 is lowered, a shovelful or two of dirt is dumped in through the upper open end of the cylinder 11 onto the piston 12 as indicated at 17 in Fig. 1, the roots 10 of the tree with the dirt clinging thereto are inserted into the cylinder, some dirt is shoveled into the open upper end of the cylinder, as shown at 18, which dirt finds its way downward onto and in-between the roots 10, and more dirt is thrown in until the cylinder is about full. The semicircular cylinder head members 16 are then swung into place so as to embrace the tree trunk 18ª. Power is then applied to the piston rod 13. This pushes the whole mass inside of the cylinder upwardly, this mass including the dirt, the roots, and the tree trunk. This compacts the entire mass, including the dirt in-between the roots and the dirt in the cylinder above the roots. This packing does not result in bunching the roots as in the prior art method in which the pressure is applied from the sides and tends to concentrate or bunch the roots. To remove the packed roots the cylinder head members are swung outwardly, and further pressure may be applied to lift this piston 12 higher and push the roots and dirt packed around them out of the cylinder. The tree is then ready for packaging.

If desired, a semicircular side portion 19 of the cylinder may be mounted to swing on hinges 20 from the closed position shown in Fig. 6 to the dotted-line position shown. This will enable the tree with the roots and the dirt packed therearound to be removed from the cylinder by sidewise movement, avoiding the necessity for moving the piston 12 up to top position. In order to hold the hinged section 19 in closed position when packing pressure is exerted, the hinged sections 16 of the cover may be provided with overhanging inwardly extending flange portions 21 which will latch under the outwardly extending flange portion 22 of the swingable semicircular portion of the cylinder.

While I have described the roots of the plant as having dirt clinging thereto when inserted into the cylinder, there are conditions under which most of the earth is shaken out of the roots before the roots are inserted in the cylinder. For example, if plants or trees are to be shipped a substantial distance before having their roots packaged, the expense of transportation may be lessened considerably by shaking out most of the dirt from the roots before shipping. When these are received at the packaging plant enough earth is shoveled into the cylinder among and around the roots to provide ample packaging material.

In the packaging apparatus shown in Figs. 8, 9, and 10, the cylinder 23 is made in two semicylindrical portions 24 and 25, hinged together at their lower ends as indicated at 26, so that they will swing away from each other into the dotted-line position shown in Fig. 8 about a transverse axis extending diametrically of the bottom 27 of the cylinder. The piston means which operate in this cylinder 23 are moved downwardly to pack the earth around the roots. The piston means comprise two semicircular piston members 28 and 29 which operate on opposite sides of the trunk 18ª of the tree or plant. Any suitable means are provided for operating the piston rods 30 and 31 in synchronism. The arcuate piston members are provided with arcuate recesses 32 to provide clearance for the trunk of the tree in the up-and-down movement of the piston. If desired, means may be provided whereby the roots may be bagged at the same time they are being packed. For this purpose, I provide an annular supporting member 33 for the upper end of the bag 34, secured in fixed relation with respect to the cylinder and provided with circumferentially spaced fastening pins or elements 35 to which the upper edge of the bag may be secured. The bag 34 itself extends downwardly into the cylinder and may be made to fit snugly thereagainst in any suitable manner.

In using this device, the cylinder is placed in the position shown in full lines (shown in Fig. 8), the latches 36 are fastened in order to secure the semicylindrical portions in engagement with each other, a bag 34 is inserted into the cylinder, its upper edges are secured to the annular support 33, and the bag 34 is secured on the pins 35 and is fitted smoothly against the inside surface of the cylinder 23. Some dirt is dumped into the upper end of the cylinder, passes down below the piston members 28 and 29, and finds its way to the bottom of the cylinder, the roots of the tree are inserted into the cylinder, the piston members being drawn upwardly sufficiently to enable this to be done, more dirt is then thrown into the cylinder on top and around the sides of the roots, and the piston members are then brought down to pack the earth around the roots.

To remove the roots, packaged earth, and the bag in which the roots and earth are packed, the latches 36 are released to enable the semicylindrical portions 24 and 25 of the cylinder to be swung about the axis from the full-line position to the dotted-line position shown in Fig. 8. The roots, packaged earth, and surrounding bag may then be removed from the packaging apparatus.

As shown in Fig. 11, the bag 34 may be made of two sheets of fabric 38 and 39. The first sheet is generally rectangular and is wrapped around into cylindrical form, the overlapping edges being stitched or otherwise secured together as shown at 40. The upper edges of this cylindrical sheet may be stretched or flanged outwardly as shown at 41 so that they can hook over the pins 35 of the annular support 33. The bottom of the bag is formed by a circular sheet 39 of fabric having its peripheral edge secured as by stitching to the lower circular edge of the cylindrical sheet of fabric, as shown at 42.

Where the word "plant" is used in the claims, it is to be understood broadly as covering trees, shrubs, vines, etc. Where the word "earth" is used in the claims, it is to be understood broadly as covering any material suitable for packing around roots.

Further modifications will be apparent to those skilled in the art, and it is desired, therefore, that the invention be limited only by the scope of the appended claims.

Having thus described my invention, what I claim and desire to secure by Letters Patent is:

1. Apparatus for compressing the roots of an extracted plant, together with the earth between and surrounding the roots, into a compact mass comprising a container of substantially uniform cross section into which the roots and earth are introduced, a closure for one end of the container embracing the trunk of the plant, and a piston in said container having relative movement with respect thereto longitudinally of the axis of the trunk for compressing the roots and earth within the container between said piston and closure.

2. Apparatus for compressing the roots of an extracted plant, together with the earth between and surrounding the roots, into a compact mass comprising a container of substantially uniform cross section into which the roots and earth are introduced, a closure for one end of the container embracing the trunk of the plant, and a piston in said container having relative movement with respect thereto longitudinally of the axis of the trunk for compressing the roots and earth within the container between said piston and closure, said closure being made in separable sections readily movable away from the trunk to enable the removal of the tree and the compact mass from the container and insertion of the roots of the plant and the adhering earth into the container.

3. Apparatus for compressing the roots of an extracted plant, together with the earth between and surrounding the roots, into a compact mass comprising a container of substantially uniform cross section into which the roots and earth are introduced, a closure for one end of the container embracing the trunk of the plant, and a piston in said container having relative movement with respect thereto longitudinally of the axis of the trunk for compressing the roots and earth within the container between said piston and closure, said closure being made in separable sections readily movable away from the trunk to enable the removal of the tree and the compact mass from the container and insertion of the roots of the plant and the adhering earth into the container, said sections being hinged to swing laterally away from said trunk.

4. Apparatus for compressing the roots of an extracted plant, together with the earth between and surrounding the roots, into a compact mass comprising a container of substantially uniform cross section into which the roots and earth are introduced, a closure for one end of the container embracing the trunk of the plant, and a piston in said container having relative movement with respect thereto longitudinally of the axis of the trunk for compressing the roots and earth within the container between said piston and closure, said container having a side section readily movable away from the rest of the container to enable the trunk to be removed sidewise from the container.

5. Apparatus for compressing the roots of an extracted plant, together with the earth between and surrounding the roots, into a compact mass comprising a container of substantially uniform cross section into which the roots and earth are introduced, a closure for one end of the container embracing the trunk of the plant, and a piston in said container having relative movement with respect thereto longitudinally of the axis of the trunk for compressing the roots and earth within the container between said piston and closure, said closure being made in separable sections readily movable away from the trunk to enable the removal of the tree and the compact mass from the container and insertion of the roots of the plant and the adhering earth into the container, said container having a side section readily movable away from the rest of the container to enable the trunk to be removed sidewise from the container.

6. Apparatus for compressing the roots of an extracted plant, together with the earth between and surrounding the roots, into a compact mass comprising a container of substantially uniform cross section into which the roots and earth are introduced, a closure for one end of the container embracing the trunk of the plant, and a piston in said container having relative movement with respect thereto longitudinally of the axis of the trunk for compressing the roots and earth within the container between said piston and closure, said closure being made in separable sections readily movable away from the trunk to enable the removal of the tree and the compact mass from the container and insertion of the roots of the plant and the adhering earth into the container, said container having a side section readily movable away from the rest of the container to enable the tree to be removed sidewise from the container, said closure sections having means for holding said side section against movement.

7. Apparatus for compressing the roots of an extracted plant, together with the earth between and surrounding the roots, into a compact mass comprising a container of substantially uniform cross section into which the roots and earth are introduced, a closure means for one end of the container, and piston means in said container having relative movement with respect thereto toward and from said closure means for compressing the roots and earth within the container between said piston means and closure means, one of said means having an opening through which the trunk of the plant extends.

8. Apparatus for compressing the roots of an extracted plant, together with the earth between and surrounding the roots, into a compact mass comprising a container of substantially uniform cross section into which the roots and earth are introduced, a closure for one end of the container, and piston means in said container having relative movement with respect thereto for compressing the roots and earth within the container between said piston means and closure, said piston means having an opening through which the trunk of the plant extends.

9. A method for compressing the roots of an extracted plant, together with the earth between and surrounding the roots, into a compact mass which comprises confining the roots and the earth between and surrounding the roots against extreme lateral movement away from the axis of the trunk of the plant, restraining the upper surface of the roots and earth against movement longitudinally of the trunk and exerting pressure axially of the trunk on the lower surface of the confined roots and earth to compress them axially and spread them radially.

SAMUEL E. CLEGG.

References Cited in the file of this patent

UNITED STATES PATENTS

| Number | Name | Date |
|---|---|---|
| 42,391 | Milo | Apr. 19, 1864 |
| 357,698 | Burrough | Feb. 15, 1887 |
| 586,485 | Guyn | July 13, 1897 |
| 1,129,924 | Von Hassel | Mar. 2, 1915 |
| 1,664,913 | Bewley | Apr. 3, 1928 |
| 1,689,017 | Fewkes | Oct. 23, 1928 |
| 1,708,752 | Caras | Apr. 9, 1929 |
| 1,964,689 | Quillen et al. | June 26, 1934 |
| 2,112,872 | Wilson | Apr. 5, 1938 |
| 2,219,690 | Leydecker | Oct. 29, 1940 |
| 2,243,955 | Gwathmey et al. | June 3, 1941 |
| 2,410,203 | Culley | Oct. 29, 1946 |
| 2,506,662 | Cusenbary | May 9, 1950 |
| 2,508,284 | Oliver | May 16, 1950 |